April 13, 1937. J. A. HEIDBRINK 2,076,562
GAUGE FOR INDICATING THE VOLUME OF FLOW OF GASES
Filed July 5, 1935
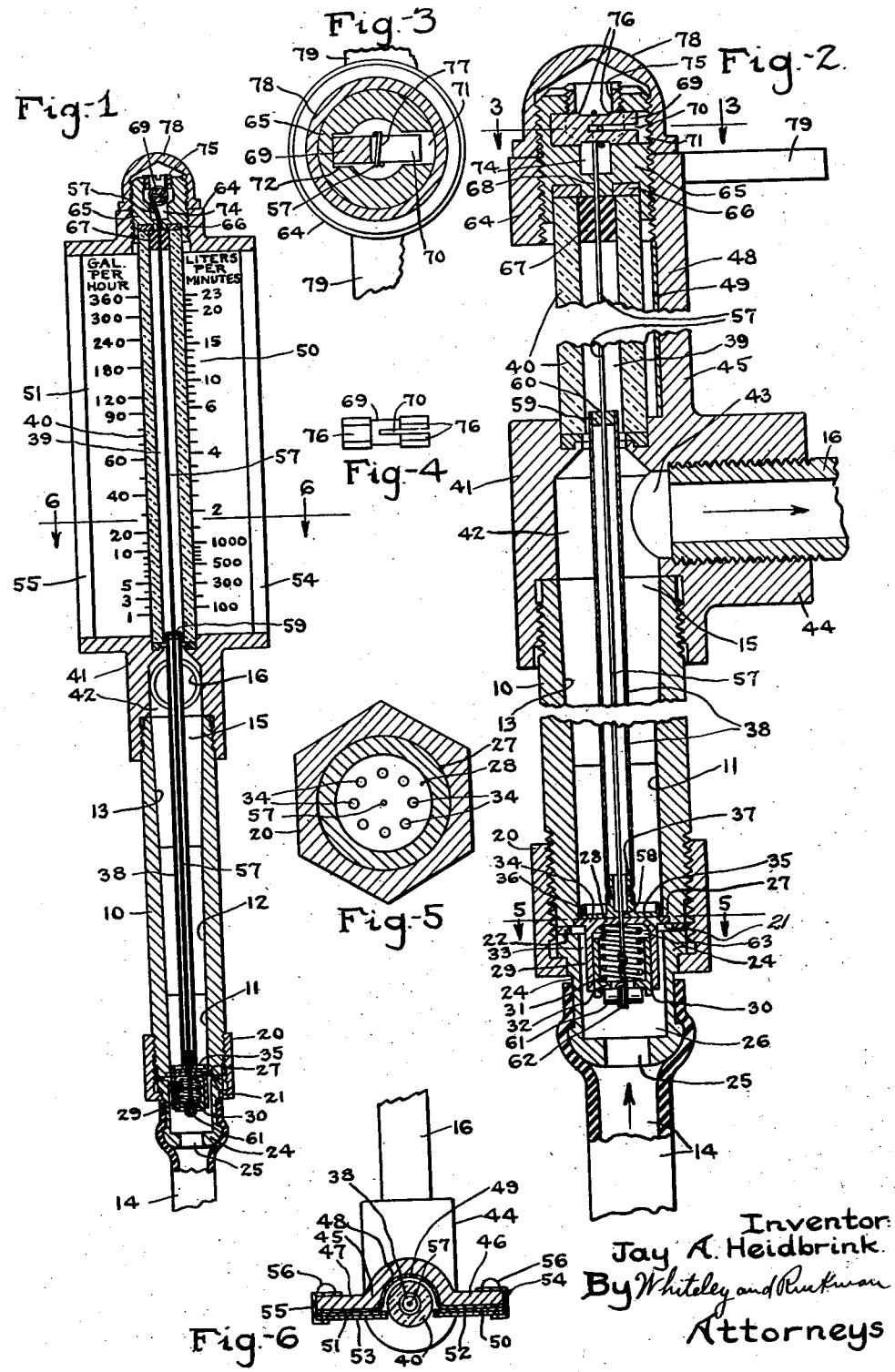
Inventor:
Jay A. Heidbrink.
By Whiteley and Ruckman
Attorneys Patented Apr. 13, 1937

2,076,562

UNITED STATES PATENT OFFICE 2,076,562

GAUGE FOR INDICATING THE VOLUME OF FLOW OF GASES

Jay A. Heidbrink, Minneapolis, Minn.

Application July 5, 1935, Serial No. 29,838

4 Claims. (Cl. 73—209)

My invention relates to improvements in gauges for indicating the volume of flow of gases, and has for its principal purpose to provide a flow tube and an indicating tube associated therewith, the flow tube having connection with gas-delivering means and embodying an indicator member adapted to operate in the indicating tube, and means in the flow tube rigidly connected with the indicating member and subject to the gases moving through the flow tube to move the indicating member in a manner proportionate to the gases flowing through the flow tube, said indicating member and its attached operating means being mounted for movements lineally with substantially negligible friction contacts, whether the organization is held in a vertical position, or for convenience in reading in an angular position.

It is an object of the invention to support the piston and the indicating member in such manner that no part of either will contact the walls of either the flow tube or the gauge tube associated therewith, thus eliminating friction in the movement of the piston and attached indicating member and wear which might change the character of the flow opening about and past said piston in the flow tube.

It is a further object of the invention to form a bore extending lineally through the piston and the attached indicating member having limited bearing points at or adjacent the piston and the end of the indicating member most removed therefrom, said piston and indicating member being strung upon a supporting fine wire held so as to form a linear guide extending centrally along the interior of the flow tube and of the gauge tube connected therewith, and to mount said guide wire so that it will be held rigidly under spring tension in its aforesaid central position, and so that the tension thereon may be increased from time to time to insure a rigid straight-line guide for the piston and attached indicating member.

It is a further object of my invention to provide printed scales preferably colored to accord with the gases being used, and to mount them in a novel manner adjacent the gauge tube to make readings therefrom on the indicating member particularly simple and effective.

This application is in part an improvement of my application Serial Number 694,818, filed October 23, 1933.

The full objects and advantages of my invention will appear in connection with the detailed description thereof, and the novel features of the invention are particularly pointed out in the claims.

In the drawing, illustrating an application of my invention in one form of gauge for indicating flow of gases, Fig. 1 is an elevation view, partly in section, of the flow tube and gauge construction. Fig. 2 is an enlarged sectional view taken at right angles to the showing of Fig. 1. Fig. 3 is a sectional view taken on line 3—3 of Fig. 2. Fig. 4 is a view of the wire-tightening member detached from the assemblage. Fig. 5 is a sectional view taken on line 5—5 of Fig. 2. Fig. 6 is a sectional view taken on line 6—6 of Fig. 1.

As illustrated, a flow tube 10 has interior walls 11 everywhere circular in cross-section but increasing in diameter from the lower end thereof. Preferably the assemblage will provide other wall portions 12 and 13 of the interior of the flow tube which will be circular in all cross-sections but will have increasing diameters at a progressively more rapid rate. That is, the walls 11 diverge in a relatively small degree, the walls 12 diverge in a larger degree than the walls 11 and the walls 13 diverge in a still larger degree than the walls 12.

Gas or a mixture of gases is admitted to the interior of the flow tube through a tube connection 14 and through ports at the inlet end of the flow tube, which will be hereinafter described, and leaves through a port 15 at the other end of the flow tube which connects with tubing 16 passing to any suitable distributing or inhaling device.

Upon the lower end of flow tube 10 is threaded a nut 20 which is adapted to engage and hold a packing washer 22 against the lower end of flow tube 10, and which also holds a nipple member 24 to which the tube 14 is secured in a customary manner. An aperture 25 leads through the end of nipple member 24 to a chamber 26 therein. As clearly shown in Fig. 2, the end of flow tube 10 is interiorly recessed as indicated at 21 to form an annular ledge 27 against which and within the recess 21 is seated and centered a disc 28 for a purpose hereinafter described. Depending into the chamber 26 from the disc 28 is a cylindrical cup 29 which forms a housing for a cylindrical slide 30. In the slide 30 is a compression spring 31. The slide 30 is provided with an annular flange 32 for a purpose hereinafter to be specified. The cylindrical cup 29 is of less diameter than that of the chamber 26, leaving an annular passageway 33 about the same. With this passageway is connected a multiplicity of ports 34, clearly shown in Figs. 2 and 5, which admit the gas from the chamber 26 to the interior of the flow tube 10 in a balanced annular manner about the lower end of said interior and said openings 34 are disposed at such an angle as to direct the gas toward the axial line of the flow tube.

Adapted to rest by gravity upon the disc 28 is a piston member 35 preferably formed with an upturned flange 36. The outer diameter of the piston member is almost equal but very slightly less than the lower diameter of the portion 11 of the flow tube, and receives directly beneath it the inflow of gas through the ports 34, which as shown are directed toward the axial center of the flow tube 10, thus providing effective impingement with the lower wall of the piston 35. This piston when in zero position rests upon the upper surface of the inverted cup member 29 and prevents any backward flow of gas. The piston 35 is provided with a nipple or shank 37 to which is secured an indicating member 38 extending along the axis of the flow tube 10. The indicating member 38 preferably is made of light hollow metallic tubing so as to be light in weight and have the least possible response to changes in temperature. The indicating member 38 is adapted to operate lineally in the bore 39 of a transparent gauge tube 40 which extends axially from the end of the flow tube 10, as clearly shown in Figs. 1 and 2. As shown in these figures, a casting support 41 is provided forming a chamber 42. The flow tube 10 is secured by threading, or in any desired manner, to the support 41, and the chamber 42 comprises an extension of the passageway on the inside of the flow tube 10. From the chamber 42 there leads a port 43 through an extension 44 to which the outlet tube 16 is connected. The support 41 also has an upright portion 45 embodying wing members 46 and 47 and a recessed portion 48 having its interior cross-section semicircular. Upon the surface of the wings 46, 47 and of the half cylinder 48 is secured a strip of paper 49 or layer of paint or other desirable covering to give a white or suitable background as shown in Fig. 6 visible through the transparent gauge tube 40. Upon the wing portions 46 and 47 are laid gauge scales 50 and 51, one calibrated to show liters per minute and the other gallons per hour. These gauge strips are held in position by overlying transparent plates 52 and 53 held by clamps 54 and 55 secured by screws 56 extending into the wing members 46 and 47, all as clearly shown in Fig. 6. In this manner, as shown in Fig. 1, the gauge scales, which may be printed in any desirable manner and with suitable coloring on cardboard or the like, appear in close proximity to the transparent gauge tube, in such manner that readings from the end of the gauge indicator 38 may be made with ease and accuracy.

To hold the piston 35 and the gauge indicator 38 from contacting with the inner walls of the flow tube 10 or of the transparent gauge tube 40, I provide a wire 57, preferably a fine wire formed of some hard, highly polished material such as chrome steel or hardened Monel metal. The piston 35 is provided with a central aperture 58, Fig. 2, through which the wire 57 extends, and the upper end of the indicating tube 38 is fitted with a plug or closure member 59 provided with an alined aperture 60 so that the wire 57 forms a continuous guide along the axial centers of the flow tube 10 and the gauge tube 40. The lower end of the wire 57 extends through the coil spring 31 and is secured about a retainer piece 61, as indicated at 62 in Fig. 2. The retainer piece 61 fits within the cylindrical slide member 30 against the annular flange 32 hereinbefore described, which slide will be held spaced from the disc 28 by the coil spring 31 as indicated at 63. The manner of holding the wire 57 upon the other end of the device, and of tensioning the same, is clearly shown in Figs. 1, 2, and 3. A ring member 64 on the casting upright 45 has threaded therein a packing nut 65 which engages a packing washer 66 on the top of the gauge tube 40. The washer 66 in turn engages with its inner edges a packing plug 67 of rubber or other suitable material which will tightly clasp the wire 57 and in conjunction with the packing washer 66 will effectively seal the end of the transparent gauge tube 40. The wire 57 passes through a bore 68 in the lower wall of the packing nut 65, which is in axial alinement with the opening 58 in the piston 35 and the opening 60 in the plug 59. The wire is wrapped around a tightening piece 69, being passed through a slot 70 therein, best shown in Fig. 4. The piece 69 is seated in a transverse bore indicated at 71, 72 of Fig. 3, the wire extending down through a chambered portion 74 to the bore 68. The bore 71 extends through the side wall of the packing nut 65 as clearly indicated in Fig. 3. A clamp nut 75 is adapted to engage flats 76 on the tightening piece 69 and hold it in any desired clamped position. With a screw driver in the slot 70 of the piece 69 the same may be turned and the wire 57 be caused to be wound around it as indicated at 77 of Fig. 3. In this way the wire is pulled tight against the compression of spring 31 in the slide 30, and when a sufficient degree of tightness is attained to provide a straight lineal guide for the piston 35 and gauge indicator 38 the clamp nut 75 is turned down so as to hold the piece 69 and the wire connected therewith in such desired position. The force of the spring 31 will at all times hold the wire taut regardless of changes of temperature which may occur. A cap 78 is threaded upon the packing nut 65 to make a proper closure of the construction. If desired an extension or extensions 79 may be formed integrally with the standard 45 for use in securing the construction in desired position.

The advantages of my invention will be apparent from the foregoing description. First, and of primary importance, is the fact that the piston in the flow tube and the elongated indicating member rigidly connected therewith are held truly alined to move along the axes of the flow tube and the indicating tube, always centered in each of them so that no part of either piston (except at the instant it begins to move) or of the indicating member, will ever contact any portion of the walls of the flow tube or of the indicating tube, regardless of whether said tubes are held vertical, or, for convenience in reading, may be held at an angle. This highly desirable result is produced by reason of the engagement of the small-area bores 58 and 60 with the polished hard-surfaced wall of the wire 57 in suchwise that all friction from contact is negligible. Further because of the spring tensioning of the wire 57 it will always remain extended along the axes of the flow tube and the indicating tube regardless of changes in temperature. A second highly important advantage of the construction is the arrangement of the transparent gauge tube in reference to the scales and the manner in which such scales, conveniently printed and colored as desired, are held clamped in close juxtaposition to the flow tube so that the squared end of the indicating member always conveniently will indicate on said scales or either of them a desired reading.

I claim:

1. A flow indicator comprising a flow tube having conical diverging walls and a gauge tube held in axial alinement with the flow tube and opening thereinto, a piston of substantially the smallest diameter of said walls movable in the flow tube, an elongated indicating member rigidly secured to the piston and adapted to extend into the gauge tube, a wire extending through the piston and indicating member and along the axes of the flow tube and the gauge tube to hold and guide the piston and indicating member, a spring connected with the wire, and means for winding the wire to put tension on the spring.

2. A flow indicator comprising a flow tube having conical diverging walls and a gauge tube held in axial alinement with the flow tube and opening thereinto, a piston of substantially the smallest diameter of said walls movable in the flow tube, an elongated indicating member rigidly secured to the piston and adapted to extend into the gauge tube, a wire extending through the piston and indicating member and along the axes of the flow tube and the gauge tube to hold and guide the piston and indicating member, a spring having connection with one end of the wire, a rotatable tensioning member having connection with the other end of the wire and adapted to compress the spring to hold the wire taut and straight, and means for locking the tensioning member in desired position.

3. A flow indicator comprising a flow tube having conical diverging walls, a transparent gauge tube held in axial alinement with said flow tube and opening thereinto, an inverted cup-shaped member secured to the lower end of said flow tube and having openings for passage of gas into the latter, a cylindrical slide housed in said cup-shaped member, a coiled spring in said slide tending to hold said slide resiliently downward in said cup-shaped member, a wire anchored to the lower end of said slide and extending along the axes of said flow tube and gauge tube, securing means for the upper end of said wire at the top of said gauge tube, a piston movable in said flow tube and when in zero position resting upon said cup-shaped member, and an elongated indicating member rigidly secured to said piston and adapted to move up into said gauge tube, said wire extending through said piston and indicating member to constitute a guide therefor.

4. A flow indicator comprising a flow tube having conical diverging walls, a transparent gauge tube held in axial alinement with said flow tube and opening thereinto, an inverted cup-shaped member secured to the lower end of said flow tube, the upper wall of said cup-shaped member containing openings for passage of gas directed toward the axial line of said flow tube, a wire anchored at the lower end of said cup-shaped member and extending along the axes of said flow tube and gauge tube, securing means for the upper end of said wire at the top of said gauge tube, a piston movable in said flow tube and when in zero position resting upon said cup-shaped member, and an elongated indicating member, and adapted to move up into said gauge tube, said wire extending through said piston and indicating member to constitute a guide therefor.

JAY A. HEIDBRINK.